United States Patent
Kim et al.

(10) Patent No.: US 9,581,759 B2
(45) Date of Patent: Feb. 28, 2017

(54) QUANTUM DOT SHEET AND LIGHT UNIT AND LIQUID CRYSTAL DISPLAY INCLUDING THE SAME

(71) Applicant: SAMSUNG DISPLAY CO., LTD., Yongin, Gyeonggi-Do (KR)

(72) Inventors: Dong-Uk Kim, Hwaseong-si (KR); Hae Il Park, Seoul (KR); Seon-Tae Yoon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 198 days.

(21) Appl. No.: 14/610,797

(22) Filed: Jan. 30, 2015

(65) Prior Publication Data

US 2016/0061417 A1  Mar. 3, 2016

(30) Foreign Application Priority Data

Aug. 26, 2014 (KR) .................. 10-2014-0111701

(51) Int. Cl.
*G02F 1/1335* (2006.01)
*F21V 9/16* (2006.01)
*F21V 8/00* (2006.01)

(52) U.S. Cl.
CPC ......... *G02B 6/0088* (2013.01); *G02B 6/0026* (2013.01); *G02B 6/0073* (2013.01); *G02F 1/1336* (2013.01); *G02F 1/133603* (2013.01); *G02F 2001/133614* (2013.01)

(58) Field of Classification Search
None
See application file for complete search history.

(56) References Cited

U.S. PATENT DOCUMENTS 6,002,458 A * 12/1999 Kaneko ............. G02F 1/133621
 349/5
2007/0086211 A1* 4/2007 Beeson ............. G02F 1/133603
 362/628

(Continued)

FOREIGN PATENT DOCUMENTS

KR 10-2012-0057298 * 6/2012
KR 10-2012-0057298 A 6/2012

(Continued)

OTHER PUBLICATIONS

Min, K., et al., *Model calculations for enhanced fluorescence in photonic crystal phosphor*, Optics Express, vol. 20, No. 3, Jan. 30, 2012, pp. 2452-2459.

(Continued)

*Primary Examiner* — Ryan Crockett
(74) *Attorney, Agent, or Firm* — Lewis Roca Rothgerber Christie LLP (57) ABSTRACT

Aspects according to one or more embodiments of the present invention are directed toward a quantum dot sheet, and a light unit and a liquid crystal display including the same, having desirable features of being capable of increasing light efficiency. According to exemplary embodiments of the present invention, it is possible to increase light efficiency by forming a quantum dot sheet including quantum dots in a pattern in which multiple layers having different refractive indexes are repeatedly stacked.

20 Claims, 5 Drawing Sheets

(56) References Cited

U.S. PATENT DOCUMENTS

| | | | | |
|---|---|---|---|---|
| 2010/0038541 A1* | 2/2010 | Clark | ............... | B82Y 20/00 250/338.1 |
| 2013/0335677 A1* | 12/2013 | You | ............... | G02F 1/133609 349/65 |
| 2015/0048348 A1* | 2/2015 | Huang | ............... | H01L 27/322 257/40 |
| 2015/0062490 A1* | 3/2015 | Kwon | ............... | G02F 1/133621 349/64 |
| 2015/0179857 A1* | 6/2015 | Lin | ............... | H01L 31/0687 136/255 |
| 2015/0228869 A1* | 8/2015 | Yoo | ............... | H01L 33/54 362/97.3 |
| 2015/0285969 A1* | 10/2015 | Kim | ............... | G02B 5/201 359/891 |
| 2015/0342045 A1* | 11/2015 | Nakabayashi | ............... | G02B 6/0073 362/611 |
| 2016/0070137 A1* | 3/2016 | You | ............... | G02F 1/133609 349/71 |

FOREIGN PATENT DOCUMENTS

| | | | |
|---|---|---|---|
| KR | 10-2012-0133062 | * | 12/2012 |
| KR | 10-2012-0133062 A | | 12/2012 |
| KR | 10-2012-0135999 | * | 12/2012 |
| KR | 10-2012-0135999 A | | 12/2012 |
| KR | 10-2013-0046222 | * | 5/2013 |
| KR | 10-2013-0046222 A | | 5/2013 |

OTHER PUBLICATIONS

Kim, D.U., et al., *Free-standing GaN-Based Photonic Crystal Band-Edge Laser*, IEEE Photonics Technology Letters, vol. 23, No. 20, Oct. 15, 2011, pp. 1454-1456.

Kim, S., et al., *Band-edge lasers based on randomly mixed photonic crystals*, Optics Express, vol. 18, No. 8, Apr. 12, 2010, pp. 7685-7692.

Dowling, J.P., et al., *The photonic band edge laser: A new approach to gain enhancement*, Journal of Applied Physics, vol. 75, Feb. 15, 1994, pp. 1896-1899.

* cited by examiner

QUANTUM DOT SHEET AND LIGHT UNIT AND LIQUID CRYSTAL DISPLAY INCLUDING THE SAME

CROSS-REFERENCE TO RELATED APPLICATION

This application claims priority to and the benefit of Korean Patent Application No. 10-2014-0111701, filed in the Korean Intellectual Property Office on Aug. 26, 2014, the entire content of which is incorporated herein by reference.

BACKGROUND

1. Field

The present invention relates to a quantum dot sheet, and a light unit and a liquid crystal display including the same.

2. Description of the Related Art

Unlike emissive displays such as plasma display panels (PDPs), field emission displays (FEDs), etc., liquid crystal displays (LCDs) are non-emissive displays that are incapable of emitting light by themselves, and thus incident light from the outside is required to display an image. Thus, a backlight unit (BLU) for emitting light is positioned at a rear side of an LCD.

A cold cathode fluorescent lamp (CCFL) has been utilized as a light source for the BLU for the LCD. However, as sizes of the LCDs become larger, when the CCFL is utilized as the light source, there is a problem that luminance uniformity is not guaranteed and color purity deteriorates.

Recently, a BLU utilizing three color light-emitting diodes (LEDs) has been developed, and the BLU utilizing these three color LEDs as a light source can implement high color purity, thereby being applicable to high quality display devices. However, the LED BLU has a drawback that its cost is very high compared with that of the BLU utilizing the CCFL as the light source. In order to overcome such a drawback, a white LED is being developed in which light emitted out of a single color LED chip is converted into white light.

However, while the white LED is economically feasible, it has a problem that color purity and color reproducibility are low, and thus efforts for utilizing a semiconductor nanocrystal as the BLU have recently been made to improve the color reproducibility and the color purity, and to ensure price competitiveness.

However, such a semiconductor nanocrystal also has a problem in that it emits light in all directions, and thus the light directed in a front direction is no more than about 50% at maximum.

The above information disclosed in this Background section is only for enhancement of understanding of the background of the invention and therefore it may contain information that does not form the prior art that is already known to a person of ordinary skill in the art.

SUMMARY

The present invention has been made in an effort to provide a quantum dot sheet, and a light unit and a liquid crystal display including the same, having desirable features such as being capable of increasing light efficiency by forming a quantum dot sheet including quantum dots in a pattern in which multiple layers having different refractive indexes are repeatedly stacked.

According to an exemplary embodiment of the present invention, a quantum dot sheet includes: a color conversion film including a first polymer layer and a second polymer layer having a refractive index different from the first polymer layer, the first and second polymer layers including red quantum dots and green quantum dots dispersed therein; and a barrier film on at least one surface of the color conversion film, wherein the first polymer layer and the second polymer layer are repeatedly stacked.

A total number of each of the first polymer layer and the second polymer layer which are repeatedly stacked may be in a range of 10 to 30.

Each of the first polymer layer and the second polymer layer may include both of the red quantum dots and the green quantum dots.

The first polymer layer may exclusively include the red quantum dots, and the second polymer layer may exclusively include the green quantum dots.

0.4 to 0.8 wt % of the quantum dots may be included based on a total weight of the first polymer layer and the second polymer layer.

A difference between refractive indexes of the first polymer layer and the second polymer layer may be in a range of 0.4 to 2.0.

The first polymer layer and the second polymer layer may include two materials selected from the group consisting of epoxy, acrylate, norborene, polyethylene, poly(vinyl butyral), poly(vinyl acetate), polyurea, polyurethane(polyurethane), polyphenylmethylsiloxane, polyphenylalkylsiloxane, polydiphenylsiloxane, polydialkylsiloxane, polysilsesquioxanes, fluorinated silicone, vinyl, hydride substituted silicone, polymethylmethacrylate, polybutylmethacrylate, and laurylmethacrylate.

At least one layer of the first polymer layer and the second polymer layer may further include light scatterers.

The light scatterers may include at least one selected from the group consisting of $TiO_2$, $Al_2O_3$, and $SiO_2$.

The barrier film may include one or more selected from the group consisting of a polyethylene terephthalate (PET) film, a polycarbonate (PC) film, and a co-polyethylene terephthalate (CoPET) film.

The color conversion film and the barrier film may further include an inorganic oxide, and the inorganic oxide may include one or more selected from silica, alumina, titanic, and zirconia.

According to another embodiment of the present invention, a light unit includes: a light source; a quantum dot sheet spaced apart from the light source and configured to convert incident light from the light source into white light to emit it toward a liquid crystal panel; and a light guide panel between the light source and the quantum dot sheet. The quantum dot sheet includes: a color conversion film including a first polymer layer and a second polymer layer having a refractive index different from the first polymer layer, the first and second polymer layers including red quantum dots and green quantum dots dispersed therein; and a barrier film on at least one surface of the color conversion film, wherein the first polymer layer and the second polymer layer are repeatedly stacked.

Yet according to another embodiment of the present invention, a liquid crystal display includes: a liquid crystal panel including upper and lower polarizers attached thereon or thereunder; and a light unit under the liquid crystal panel. The light unit includes a light source; a quantum dot sheet spaced apart from the light source and configured to convert incident light from the light source into white light to emit it toward a liquid crystal panel; and a light guide panel between the light source and the fluorescent sheet. The quantum dot sheet includes a color conversion film including a first polymer layer and a second polymer layer having a refractive index different from the first polymer layer, the first and second polymer layers including red quantum dots and green quantum dots dispersed therein; and a barrier film on at least one surface of the color conversion film, wherein the first polymer layer and the second polymer layer are repeatedly stacked.

According to the exemplary embodiments of the present invention, it is possible to increase light efficiency by forming a quantum dot sheet including quantum dots in a pattern in which multiple layers having different refractive indexes are repeatedly stacked.

DETAILED DESCRIPTION

Aspects of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. When a first element is referred to as being "coupled to" or "connected to" a second element, the first element may be directly coupled to or connected to the second element, or intervening elements may also be present. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, a quantum dot sheet according to an exemplary embodiment of the present invention will be described with reference to FIG. 1 and FIG. 2.

Figure 1:
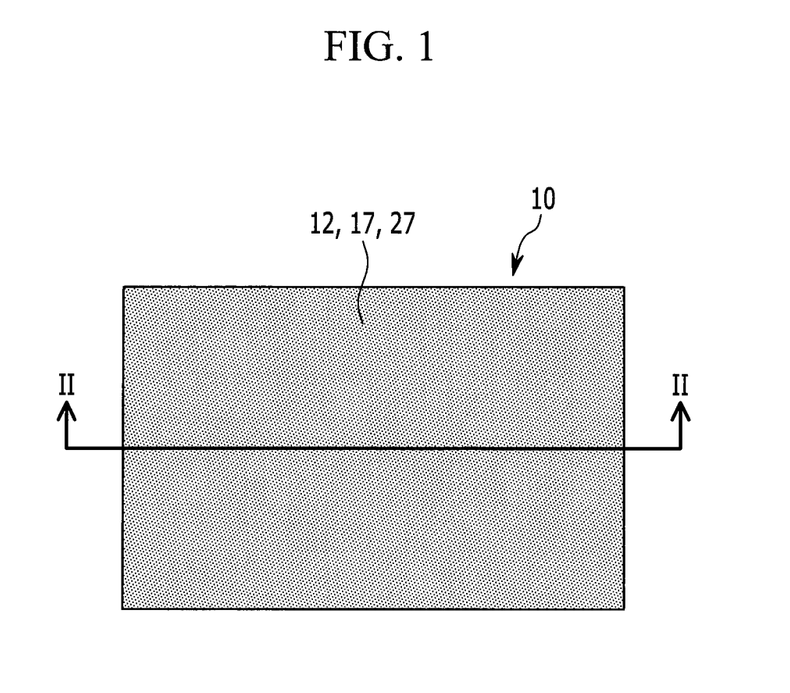
FIG. 1 is a top plan view of a quantum dot sheet according to an exemplary embodiment of the present invention.
Figure 2:
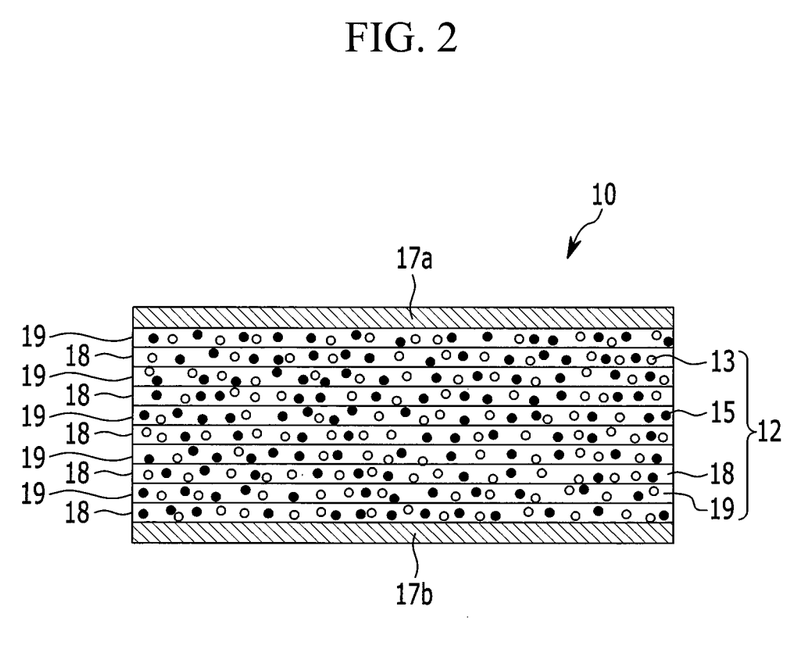
FIG. 2 is a cross-sectional view of the quantum dot sheet of FIG. 1 taken along the line II-II.

FIG. 1 is a top plan view of a quantum dot sheet according to an exemplary embodiment of the present invention, and FIG. 2 is a cross-sectional view of the quantum dot sheet of FIG. 1 taken along the line II-II.

Referring to FIGS. 1 and 2, the quantum dot sheet 10 includes a color conversion film 12 formed to have a structure in which a first polymer layer 18 and a second polymer layer 19 are repeatedly stacked. The first polymer layer 18 and the second polymer layer 19 include red quantum dots 13 and green quantum dots 15 dispersed therein.

Each of the first and second polymer layers 18 and 19 is formed of a plastic resin. The plastic resin includes various suitable materials that form a polymer or film, and kinds of the materials are not limited thereto. In the exemplary embodiment of the present invention, the plastic resin transmits light even if it is hardened, and light transmittance is not limited to any particular range in the described embodiments.

The first polymer layer 18 and the second polymer layer 19 are respectively formed of materials having different refractive indexes. In this case, the refractive index of the first polymer layer 18 may be smaller or greater than that of the second polymer layer 19.

For example, each of the first polymer layer 18 and second polymer layer 19 may include both of the red quantum dots 13 and the green quantum dots 15, and the first polymer layer 18 and the second polymer layer 19 may be stacked 5 times. In other words, five first polymer layers 18 and five second polymer layers 19 may be alternately stacked to have a total of 10 layers. The quantum dots may be included at 0.4 to 0.8 wt % based on a total weight of the first polymer layer and the second polymer layer.

Alternatively, each of first polymer layer 18 and the second polymer layer 19 may include a respective one of the red and green quantum dots 13 and 15. For example, when the first polymer layer 18 exclusively includes the red quantum dots 13 (i.e., includes only the red quantum dots 13), the second polymer layer 19 may exclusively include the green quantum dots 15. Conversely, when the first polymer layer 18 exclusively includes the green quantum dots 15, the second polymer layer 19 may exclusively include the red quantum dots 13.

As for the structure in which two layers having different refractive indexes are repeatedly stacked, light emitted from a backlight source passes through the repeatedly stacked structure having different refractive indexes and is accumulated. This accumulated light can be emitted at once. Accordingly, the total amount of emitted light can be increased, thereby improving the light efficiency of the quantum dot sheet 10.

The difference between the refractive indexes of the first polymer layer 18 and the second polymer layer 19 may be in a range of 0.4 to 2.0. When the difference between the refractive indexes of the first polymer layer 18 and the second polymer layer 19 is smaller than 0.4, too many layers may be required to be stacked to have an improved light efficiency, and when the difference between the refractive indexes thereof exceeds 2.0, it is difficult to retain the quantum dots 13 and 15.

When the difference between the refractive indexes thereof is in a range of 0.4 to 2.0, a total of 10 layers or more, e.g., five or more first polymer layers 18 and five or more second polymer layers 19, may be included to improve the light efficiency by repeatedly alternately stacking the first polymer layers 18 and the second polymer layers 19 in the order of the first polymer layer 18, the second polymer layer 19, the first polymer layer 18, the second polymer layer 19, etc. Further, the first polymer layers 18 and the second polymer layers 19 may be stacked in more layers when the refractive index difference is smaller, or may be stacked in fewer layers when the refractive index difference is greater.

For the first polymer layer 18 and the second polymer layer 19 having different refractive indexes, two materials (e.g., one for the first polymer layer 18 and one for the second polymer layer 19) selected from epoxy, acrylate, norborene, polyethylene, poly(vinyl butyral), poly(vinyl acetate), polyurea, polyurethane, polyphenylmethylsiloxane, polyphenylalkylsiloxane, polydiphenylsiloxane, polydialkylsiloxane, silsesquioxanes (e.g., polysilsesquioxanes), fluorinated silicone, vinyl, hydride substituted silicone, methylmethacrylate (e.g., polymethylmethacrylate), butylmethacrylate (e.g., polybutylmethacrylate), and/or laurylmethacrylate may be utilized.

The quantum dots 13 and 15 for embodying color reproducibility and color purity are dispersed in the first and second polymer layers 18 and 19 of the color conversion film 12. The quantum dots 13 and 15 may be selected from a group IIB-VIB compound, a group IVB-VIB compound, a group IVB element, a group IVB compound, and a combination thereof.

The group IIB-VIB compound may be selected from: a group of two-element compounds selected from CdSe, CdTe, ZnS, ZnSe, ZnTe, ZnO, HgS, HgSe, HgTe, MgSe, MgS, and a mixture thereof; a group of three-element compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a group of four-element compounds selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. A group IIIB-VB compound may be selected from: a group of two-element compounds selected from GaN, GaP, GaAs, GaSb, AlN, AlP, AlAs, AlSb, InN, InP, InAs, InSb, and a mixture thereof; a group of three-element compounds selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a group of four-element compounds selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The group IVB-VIB compound may be selected from: a group of two-element compounds selected from SnS, SnSe, SnTe, PbS, PbSe, PbTe, and a mixture thereof; a group of three-element compounds selected from SnSeS, SnSeTe, SnSTe, PbSeS, PbSeTe, PbSTe, SnPbS, SnPbSe, SnPbTe, and a mixture thereof; and a group of four-element compounds selected from SnPbSSe, SnPbSeTe, SnPbSTe, and a mixture thereof. The group IVB element may be selected from a group of Si, Ge, and a mixture thereof. The group IVB compound may be a two-element compound selected from a group of SiC, SiGe, and a mixture thereof.

Here, a core/shell structure in which some quantum dots 13 and 15 enclosing some other quantum dots 13 and 15 may be possible. An interfacing surface between the core and the shell may have a concentration gradient in which a concentration of an element decreases closer to its center (e.g., closer to the core).

The quantum dots 13 and 15 may have a full width at half maximum (FWHM) of a light-emitting wavelength spectrum which is less than about 45 nm. In this range, the color purity and reproducibility of the quantum dot sheet 10 can be improved. In addition, shapes of the quantum dots 13 and 15 are not specifically limited to shapes that are generally utilized in the related art. In one embodiment, it is desirable that a nanoparticle having a spherical, pyramidal, multi-arm, or cubic shape, a nanotube, a nanowire, a nanofiber, or a planar nanoparticle is utilized.

In FIG. 2, the color conversion film 12 is illustrated to include a mixture of the red quantum dots 13 and the green quantum dots 15, but may instead include a first layer including the red quantum dots 13 and a second layer including the green quantum dots 15. In other words, each of the first polymer layer 18 and the second polymer layer 19 may be formed to have a plurality of layers including a first layer containing the red quantum dots 13 and a second layer containing the green quantum dots 15.

The color conversion film 12 may further include an inorganic oxide, and the inorganic oxide may be selected from silica, alumina, titania, zirconia, and a combination thereof. The inorganic oxide may act as a light-diffusing material.

The quantum dot sheet 10 may further include transflective barrier films 17a and 17b on opposite surfaces of the color conversion film 12. However, a barrier film may be arranged on any one surface thereof.

The barrier films 17a and 17b may be formed of at least one of a polyethylene terephthalate (PET) film, a polycarbonate (PC) film, or a co-polyethylene terephthalate (Co-PET) film.

The barrier films 17a and 17b may further include an inorganic oxide. The inorganic oxide may be selected from silica, alumina, titania, zirconia, and a combination thereof, and the inorganic oxide may function as a light diffusing material.

In addition, the barrier films 17a and 17b may have protrusions and depressions on a surface that does not contact the color conversion film 12. The barrier films 17a and 17b, surfaces of which are formed with the protrusions and depressions, may serve to diffuse light that is emitted from an LED light source.

The barrier films 17a and 17b may have an oxygen permeability of about 0.01 $cm^3 \cdot mm/m^2 \cdot day \cdot atm$ to about 0.5 $cm^3 \cdot mm/m^2 \cdot day \cdot atm$, and a moisture permeability of about 0.001 $g/m^2 \cdot day$ to 0.01 $g/m^2 \cdot day$. When having the oxygen permeability and the moisture permeability within these ranges, the quantum dots 13 and 15 can be stably protected from an external environment.

Although not illustrated in FIG. 2, adhesive layers may be further included between the color conversion film 12 and the transflective barrier films 17a and 17b. When the barrier films 17a and 17b serve as a base material, no adhesive layer is required.

In addition, protective films may be further included on an external surface of the quantum dot sheet 10, that is, on respective surfaces of the barrier films 17a and 17b that do not contact the color conversion film 12. The protective film, as a release film, may be formed of a polyester such as polyethylene terephthalate.

Hereinafter, a quantum dot sheet 10 according to an exemplary embodiment of the present invention will be described with reference to FIG. 3.

Figure 3:
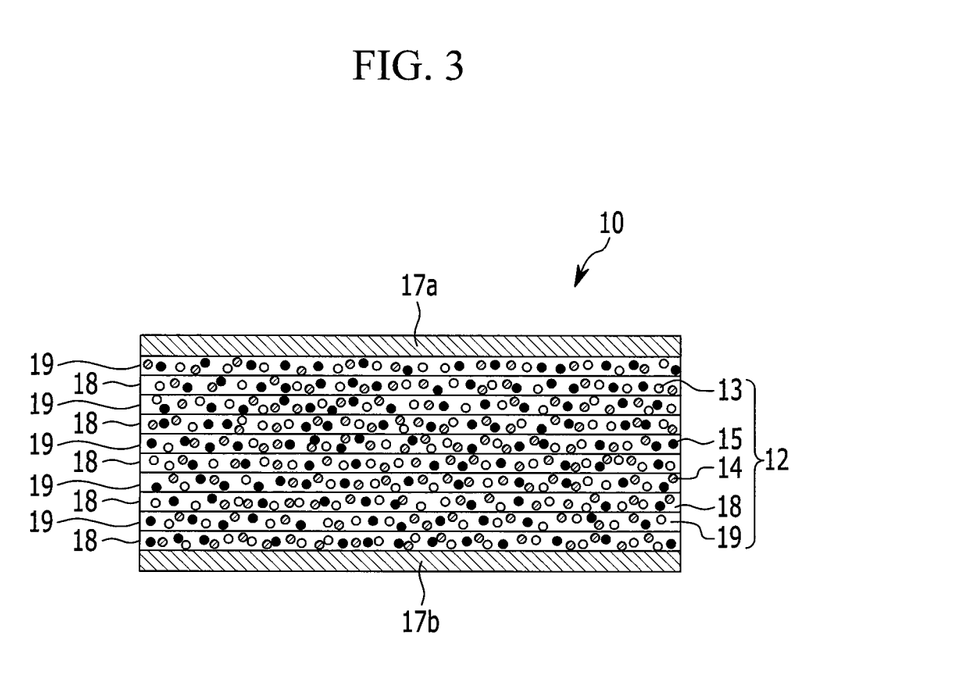
FIG. 3 is a cross-sectional view of a quantum dot sheet according to an exemplary embodiment of the present invention.
Figure 4:
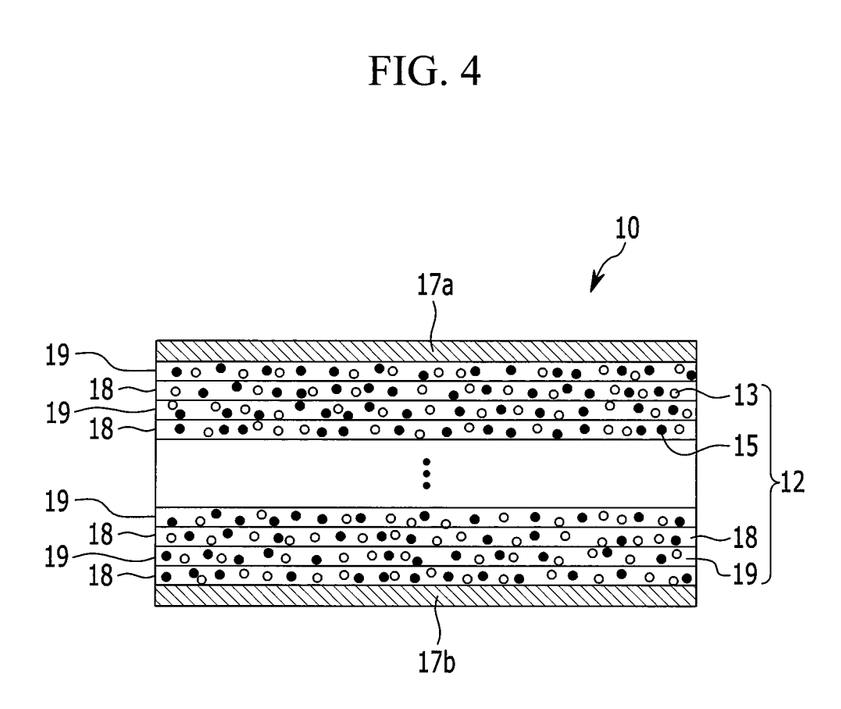
FIG. 4 is a cross-sectional view of a quantum dot sheet according to an exemplary embodiment of the present invention.

FIG. 3 is a cross-sectional view of a quantum dot sheet according to an exemplary embodiment of the present invention, and FIG. 4 is a cross-sectional view of a quantum dot sheet according to another exemplary embodiment of the present invention.

The exemplary embodiment of the present invention of FIG. 3 is substantially the same as the exemplary embodiment of FIG. 1 and FIG. 2 except for including light scatterers 14, and thus a redundant description thereof will not be provided.

As shown in FIG. 3, each of the first polymer layer 18 and the second polymer layer 19 of the quantum dot sheet 10 according to the present exemplary embodiment may further include the light scatterers 14 in addition to the quantum dots 13 and 15.

The light scatterers 14 which can be included in the first polymer layers 18 and the second polymer layers 19 may include one or more selected from $TiO_2$, $Al_2O_3$, and $SiO_2$.

The light scatterers 14 may serve as assistants for adjusting an optical path of light that is emitted toward all surfaces of the quantum dots 13 and 15 to allow the light to be transferred to a front surface of the quantum dot sheet 10, thereby further improving the light efficiency of the quantum dot sheet 10.

Hereinafter, a quantum dot sheet 10 according to an exemplary embodiment of the present invention will be described with reference to FIG. 4. The exemplary embodiment of the present invention of FIG. 4 is substantially the same as the exemplary embodiment of FIG. 1 and FIG. 2 except for the numbers of the first polymer layer 18 and the second polymer layer 19 which are stacked, and thus a redundant description thereof will not be provided.

As shown in FIG. 4, the quantum dot sheet 10 according to the present exemplary embodiment is formed in a pattern in which more layers are stacked to have greater than five first polymer layers 18 and greater than five second polymer layers 19 (a total of greater than ten layers) as compared with the above exemplary embodiments.

In the present exemplary embodiment, the number of each of the first polymer layers 18 and the second polymer layers 19 which are stacked is in a range of 10 to 30.

When a difference between the refractive indexes of the first polymer layers 18 and the second polymer layers 19 is in a range of 0.4 to 2.0, a total of 10 layers or more, i.e., five or more first polymer layers 18 and five or more second polymer layers 19, may be included to improve the light efficiency by repeatedly alternately stacking the first polymer layers 18 and the second polymer layers 19 in the order of the first polymer layer 18, the second polymer layer 19, the first polymer layer 18, the second polymer layer 19, etc. Further, the first polymer layers 18 and the second polymer layers 19 may be stacked in more layers as the refractive index difference is smaller or may be stacked in fewer layers as the refractive index difference is greater.

Hereinafter, a liquid crystal display including the quantum dot sheet 10 according to an exemplary embodiment of the present invention will be described with reference to FIG. 5.

Figure 5:
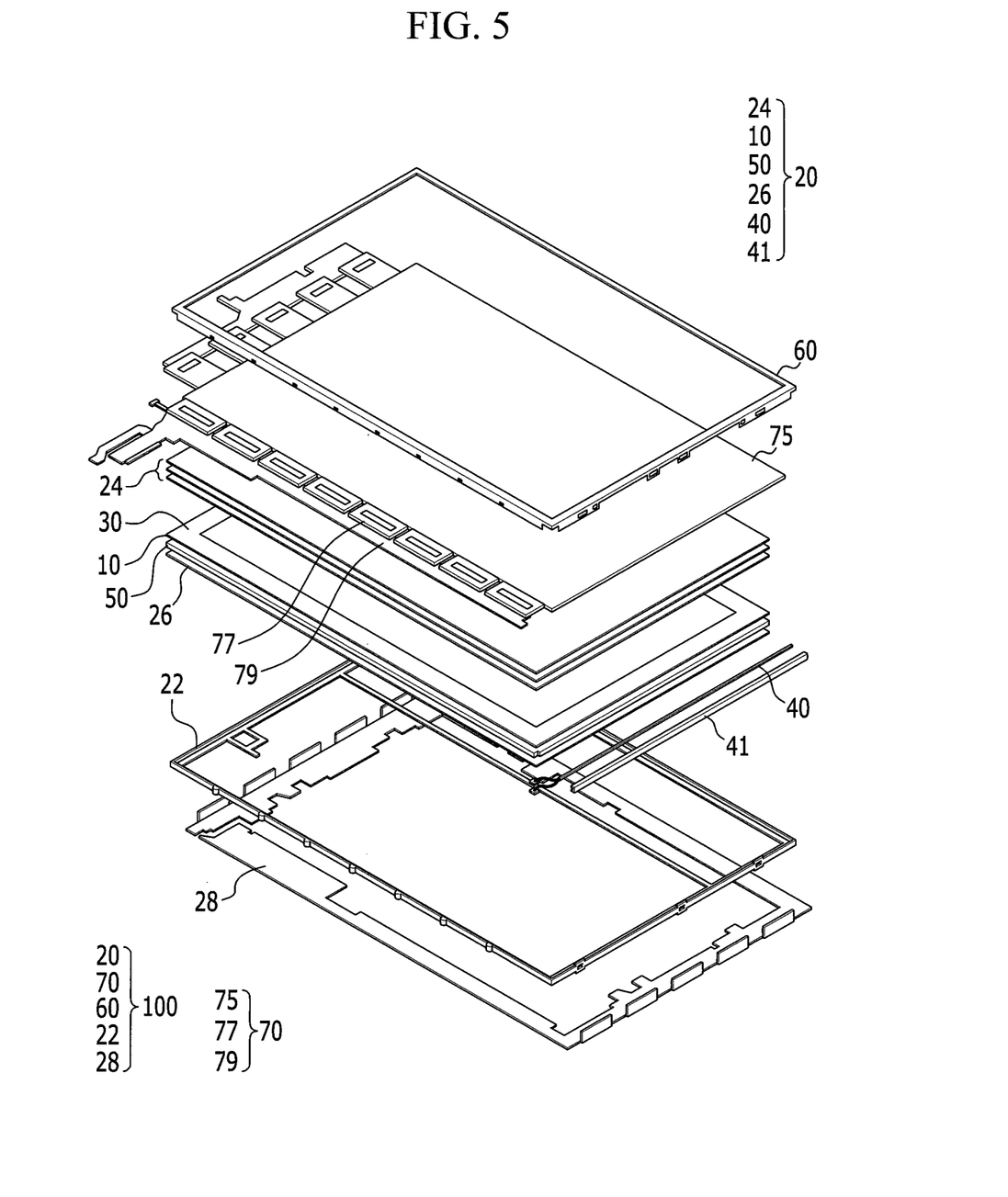
FIG. 5 is an exploded perspective view of a liquid crystal display including the quantum dot sheet of FIG. 1.

FIG. 5 is an exploded perspective view of a liquid crystal display including the quantum dot sheet (e.g., quantum film) of FIG. 1.

As an example of a display device, the LCD 100 is illustrated in FIG. 5.

Generally, the LCD 100 according to the exemplary embodiment of the present invention includes a light unit 20 for supplying light, and a liquid crystal panel assembly 70 that is supplied with the light to display an image. In addition, a top chassis 60, a mold frame 22, and a bottom chassis 28 are provided to fixedly support them.

The light unit 20 supplies the light to the liquid crystal panel assembly 70, and the liquid crystal panel assembly 70 positioned above the light unit 20 controls the transmission of light supplied from the light unit 20 to express gray levels, thereby displaying an image.

First, the liquid crystal panel assembly 70 includes a liquid crystal panel 75, an integrated circuit (IC) chip 77, and a flexible printed circuit (FPC) board 79.

The liquid crystal panel 75 includes a TFT substrate including a plurality of thin film transistors (TFTs), an upper substrate on the TFT substrate, and a liquid crystal layer injected between these substrates. The IC chip 77 can be mounted on the TFT substrate to control the liquid crystal panel 75.

The TFT substrate refers to a transparent insulation substrate in which the TFTs are formed in a matrix form, and a source terminal thereof is coupled to a data line and a gate terminal thereof is coupled to a gate line. In addition, a drain terminal thereof is coupled to a pixel electrode formed of indium tin oxide (ITO), which is a transparent conductive material.

The data and gate lines of the liquid crystal panel 75 are coupled to the FPC board 79, and if an electrical signal is received from the FPC board 79, the received electrical signal is transmitted to the source and gate terminals of the TFT, the TFT is turned on or off according to a scanning signal applied to the gate terminal among the transmitted signals, and an image signal applied to the source terminal through the data line is transmitted or blocked by the drain terminal. The FPC board 79 receives the image signal from the outside of the liquid crystal panel 75, and then respectively applies a driving signal to the data and gate lines.

Meanwhile, the upper substrate is arranged above and faces the TFT substrate. The upper substrate refers to a substrate in which RGB color filters for displaying colors (e.g, set or predetermined colors) are formed by a thin film forming process, and a common electrode formed of ITO is on the color filters. When a power supply is applied to the gate and source terminals of the TFT to turn on the TFT, an electric field is generated between the pixel electrode and the common electrode of the upper substrate. The generated electric field changes alignment angles of the injected liquid crystals such that light transmittance is changed, thereby producing the desired image.

Polarizers are attached to the outside of the liquid crystal panel 75. Each of the polarizers has a transmissive axis.

The FPC board 79 generates driving signals such as image and scanning signals for driving the liquid crystal display 100 and a plurality of timing signals for applying these signals with appropriate timing, and applies the image and scanning signals to the gate and data lines of the liquid crystal panel 75, respectively.

An example structure of the liquid crystal panel 75 has been described above. However, unlike the exemplary embodiment described above, various suitable embodiments of the liquid crystal panels 75 can be utilized. For example, the common electrode and the color filter that are formed on the upper substrate may be formed on the TFT substrate. In addition, an additional printed circuit board (PCB) may be included, and the PCB and the TFT substrate may be coupled through the FPC board.

Various other suitable embodiments of a non-emissive display panel can be utilized.

The light unit 20 is provided to supply uniform light to the liquid crystal panel 75 under the liquid crystal panel assembly 70, and is arranged on the bottom chassis 28.

The top chassis 60 is provided on the liquid crystal panel assembly 70 to bend the FPC board 79 outside of the mold frame 22 and to prevent the liquid crystal panel assembly 70 from being disengaged from the bottom chassis 28.

The light unit 20 includes one or more light sources 40 that are fixed to the mold frame 22 and supply light to the liquid crystal panel assembly 70, a substrate 41 for supplying power to the light source 40, a light guide 50 that guides the light emitted from the light source 40 to supply it to the liquid crystal panel assembly 70, a reflective sheet 26 that is positioned under the light guide 50 to cover an entire surface thereof to reflect the light, and an optical sheet 24 and a quantum dot sheet 10 that ensure luminance characteristics of the light emitted from the light source 40 to provide the light to the liquid crystal panel assembly 70.

The optical sheet 24 may include at least one of a prism sheet having a prism structure and a diffuser sheet that uniformly diffuses light. In addition, the optical sheet 24 may further include a luminance enhancement film such as a dual brightness enhancement film (DBEF) that reflects light of some polarization directions but transmits light of other polarization directions perpendicular thereto.

The quantum dot sheet 10 may be positioned above or below the optical sheet 24, or if a plurality of optical sheets 24 are utilized, may be positioned between the optical sheets 24.

The exemplary embodiment of FIG. 5 uses a light emitting diode (LED) as the light source 40. The LED may be a diode for emitting blue light or ultraviolet rays. In addition, a diode for emitting light of a specific wavelength can be utilized. As described above, when the light source 40 does not emit the white light but emits light of the specific wavelength, manufacturing cost of the light source 40 decreases because a phosphor is not additionally formed in an LED package, which is utilized for the light source 40, to change the light of the specific wavelength into the white light.

As described above, the reason why the light source 40 for emitting the light of the specific wavelength can be utilized is that the quantum dot sheet 10 can amplify or generate light of different wavelengths to supply it to the liquid crystal panel 75 above the light unit 20.

That is, while being positioned to be spaced apart by a distance (e.g., a set or predetermined distance) from the LED light source 40, the quantum dot sheet 10 functions as a light converting layer that converts the light emitted from the LED light source 40 into the white light to emit it toward the liquid crystal panel assembly 70.

When the light emitted from the LED light source 40 passes through the quantum dot sheet 10 including the quantum dots, the white light in which blue, green, and red light are mixed can be produced. In this case, when compositions and sizes of the quantum dots forming the quantum dot sheet 10 are varied such that desired ratios of the blue, green, and red light can be controlled, the white light exhibiting excellent color reproducibility and purity can be produced.

The quantum dot sheet 10 includes the color conversion film 12 formed to have a structure in which the first polymer layer 18 and the second polymer layer 19, including the red quantum dots 13 and the green quantum dots 15 dispersed therein, are repeatedly stacked.

Each of the first and second polymer layers 18 and 19 is formed of a plastic resin. The plastic resin includes various suitable materials that form a polymer or film, and kinds of the materials are not limited thereto. In the exemplary embodiment of the present invention, the plastic resin transmits light even if it is hardened, and light transmittance is not limited thereto.

The first polymer layer 18 and the second polymer layer 19 are respectively formed of materials having different refractive indexes. In this case, the refractive index of the first polymer layer 18 may be smaller or greater than that of the second polymer layer 19.

For example, each of the first polymer layer 18 and second polymer layer 19 may include both of the red quantum dots 13 and the green quantum dots 15, and the first polymer layer 18 and the second polymer layer 19 may be stacked 5 times. In other words, five first polymer layers 18 and five second polymer layers 19 may be alternately stacked to have a total of 10 layers.

Alternatively, each of first polymer layer 18 and the second polymer layer 19 may include one of the red and green quantum dots 13 and 15 respectively. For example, when the first polymer layer 18 exclusively includes the red quantum dots 13, the second polymer layer 19 may exclusively include the green quantum dots 15. Conversely, when the first polymer layer 18 exclusively includes the green quantum dots 15, the second polymer layer 19 may exclusively include the red quantum dots 13.

As for the structure in which two layers having different refractive indexes are repeated stacked, light emitted from a backlight source passes through the repeatedly stacked structure having different refractive indexes and is accumulated. This accumulated light can be emitted at once. Accordingly, the total amount of emitted light can be increased, thereby improving the light efficiency of the quantum dot sheet 10.

The difference between the refractive indexes of the first polymer layer 18 and the second polymer layer 19 may be in a range of 0.4 to 2.0. When the difference between the refractive indexes of the first polymer layer 18 and the second polymer layer 19 is smaller than 0.4, too many layers are required to be stacked to have an improved light efficiency. When the difference between the refractive indexes thereof exceeds 2.0, it is difficult to retain the quantum dots 13 and 15.

When the difference between the refractive indexes thereof is in a range of 0.4 to 2.0, a total of 10 layers or more, i.e., five or more first polymer layers 18 and five or more second polymer layers 19, may be included to improve the light efficiency by repeatedly alternately stacking the first polymer layers 18 and the second polymer layers 19 in the order of the first polymer layer 18, the second polymer layer 19, the first polymer layer 18, the second polymer layer 19, etc. Further, the first polymer layers 18 and the second polymer layers 19 may be stacked in more layers when the refractive index difference is smaller, or may be stacked in fewer layers when the refractive index difference is greater.

For the first polymer layer 18 and the second polymer layer 19 having different refractive indexes, two materials (e.g., one for the first polymer layer 18 and one for the second polymer layer 19) selected from epoxy, acrylate, norborene, polyethylene, poly(vinyl butyral), poly(vinyl acetate), polyurea, polyurethane, polyphenylmethylsiloxane, polyphenylalkylsiloxane, polydiphenylsiloxane, polydialkylsiloxane, silsesquioxanes (e.g., polysilsesquioxanes), fluorinated silicone, vinyl, hydride substituted silicone, methylmethacrylate (e.g., polymethylmethacrylate), butylmethacrylate (e.g., polybutylmethacrylate), and/or laurylmethacrylate may be utilized.

Each of the first polymer layer 18 and second polymer layer 19 of the quantum dot sheet 10 according to the present exemplary embodiment may further include the light scatterers 14 in addition to the quantum dots 13 and 15.

The light scatterers 14, which can be included in the first polymer layers 18 and the second polymer layer 19, may include one or more selected from $TiO_2$, $Al_2O_3$, and $SiO_2$.

The light scatterers 14 may serve as assistants for adjusting an optical path of light that is emitted toward all surfaces of the quantum dots 13 and 15 to allow the light to be transferred to a front surface of the quantum dot sheet 10, thereby further improving the light efficiency of the quantum dot sheet 10.

Further, the quantum dot sheet 10 may be formed in a pattern in which more layers are stacked to have greater than five first polymer layers 18 and greater than five second polymer layers 19 (a total of greater than ten layers) as compared with the above exemplary embodiments.

In the present exemplary embodiment, the number of each of the first polymer layers 18 and the second polymer layers 19 which are stacked is in a range of 10 to 30.

In the meantime, the quantum dot sheet 10 may include (e.g., consist of) a first layer including the red quantum dots 13 and a second layer including the green quantum dots 15. In other words, each of the first polymer layer 18 and the second polymer layer 19 may be formed to have a plurality of layers including a first layer containing the red quantum dots 13 and a second layer containing the green quantum dots 15.

In this case, the layers may be disposed such that they have light-emitting wavelengths of lower energy when closer to the LED light source 40. For example, if the LED light source 40 is a blue LED light source, the quantum dot sheet 10 may include (e.g., consist of) a red light conversion layer and a green light conversion layer that are sequentially laminated in a direction away from the LED light source 40.

In the quantum dot sheet 10, the barrier films 17a and 17b are formed on a top surface and a bottom surface of the color conversion film 12.

According to another exemplary embodiment, a light source 40 emitting ultraviolet rays may be employed.

In addition, the light source 40 may be an edge-type light unit 20 at one side of the light guide 50, or may have a direct-type structure in which the light source 40 is positioned under the quantum dot sheet 10 in some exemplary embodiments.

The white light emitted from the light unit 20 passes through the polarizers and the liquid crystal panel 75 to form the image of set or predetermined colors.

As described above, it is possible to increase light efficiency by forming a quantum dot sheet including quantum dots in a pattern in which multiple layers having different refractive indexes are repeatedly stacked.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

| 10: quantum dot sheet | 12: color conversion film |
| --- | --- |
| 13, 15: quantum dot | 18, 19: first and second polymer layers |
| 17a, 17b: barrier film | 100: liquid crystal display |
| 20: light unit | 40: LED light source |
| 75: liquid crystal panel | 50: light guide |
| 70: liquid crystal panel assembly | 60: top chassis |
| 22: mold frame | 28: bottom chassis |
| 77: IC chip | 79: flexible circuit board |
| 24: optical sheet | 26: reflective sheet |
| 14: light scatterer | |

What is claimed is:

1. A quantum dot sheet comprising:
   a color conversion film comprising:
      a first polymer layer; and
      a second polymer layer having a refractive index different from the first polymer layer, the first and second polymer layers comprising red quantum dots and green quantum dots dispersed therein; and
   a barrier film on at least one surface of the color conversion film,
   wherein the first polymer layer and the second polymer layer are repeatedly stacked.

2. The quantum dot sheet of claim 1, wherein a total number of each of the first polymer layer and the second polymer layer which are repeatedly stacked is in a range of 10 to 30.

3. The quantum dot sheet of claim 2, wherein
   the first polymer layer exclusively comprises the red quantum dots, and
   the second polymer layer exclusively comprises the green quantum dots.

4. The quantum dot sheet of claim 2, wherein each of the first polymer layer and the second polymer layer comprises both of the red quantum dots and the green quantum dots.

5. The quantum dot sheet of claim 4, wherein 0.4 to 0.8 wt % of the quantum dots are included based on a total weight of the first polymer layer and the second polymer layer.

6. The quantum dot sheet of claim 5, wherein a difference between refractive indexes of the first polymer layer and the second polymer layer is in a range of 0.4 to 2.0.

7. The quantum dot sheet of claim 6, wherein the first polymer layer and the second polymer layer comprise two materials selected from the group consisting of epoxy, acrylate, norborene, polyethylene, poly(vinyl butyral), poly (vinyl acetate), polyurea, polyurethane, polyphenylmethylsiloxane, polyphenylalkylsiloxane, polydiphenylsiloxane, polydialkylsiloxane, silsesquioxanes, fluorinated silicone, vinyl, hydride substituted silicone, methylmethacrylate, butylmethacrylate, and laurylmethacrylate.

8. The quantum dot sheet of claim 6, wherein at least one layer of the first polymer layer and the second polymer layer further comprises light scatterers.

9. The quantum dot sheet of claim 8, wherein the light scatterers comprise at least one selected from the group consisting of $TiO_2$, $Al_2O_3$, and $SiO_2$.

10. The quantum dot sheet of claim 2, wherein the barrier film comprises one or more selected from the group consisting of a polyethylene terephthalate (PET) film, a polycarbonate (PC) film, and a co-polyethylene terephthalate (CoPET) film.

11. The quantum dot sheet of claim 10, wherein the color conversion film and the barrier film further comprise an inorganic oxide, and
   the inorganic oxide comprises one or more selected from silica, alumina, titania, and zirconia.

12. A light unit comprising:
   a light source;
   a quantum dot sheet spaced apart from the light source and configured to convert incident light from the light source into white light to emit it toward a liquid crystal panel; and
   a light guide panel between the light source and the quantum dot sheet,
   wherein the quantum dot sheet comprises:
      a color conversion film comprising a first polymer layer and a second polymer layer having a different refractive index from the first polymer layer, the first and second polymer layers comprising red quantum dots and green quantum dots dispersed therein; and
      a barrier film on at least one surface of the color conversion film,
   wherein the first polymer layer and the second polymer layer are repeatedly stacked.

13. The light unit of claim 12, wherein a total number of each of the first polymer layer' and the second polymer layer which are repeatedly stacked is in a range of 10 to 30.

14. The light unit of claim 13, wherein each of the first polymer layer and the second polymer layer comprises both of the red quantum dots and the green quantum dots.

15. The light unit of claim 13, wherein the first polymer layer exclusively comprises the red quantum dots, and
the second polymer layer exclusively comprises the green quantum dots.

16. The light unit of claim 14, wherein a difference between refractive indexes of the first polymer layer and the second polymer layer is in a range of 0.4 to 2.0.

17. The light unit of claim 16, wherein at least one layer of the first polymer layer and the second polymer layer further comprises light scatterers.

18. The light unit of claim 17, wherein the light scatterers comprise at least one selected from the group consisting of $TiO_2$, $Al_2O_3$, and $SiO_2$.

19. A liquid crystal display comprising:
a liquid crystal panel comprising upper and lower polarizers attached thereon or thereunder; and
a light unit under the liquid crystal panel,
wherein the light unit comprises:
a light source;
a quantum dot sheet spaced apart from the light source and configured to convert incident light from the light source into white light to emit it toward a liquid crystal panel; and
a light guide panel between the light source and the quantum dot sheet,
wherein the quantum dot sheet comprises:
a color conversion film comprising a first polymer layer and a second polymer layer having a refractive index different from the first polymer layer, the first and second polymer layers comprising red quantum dots and green quantum dots dispersed therein; and
a barrier film on at least one surface of the color conversion film,
wherein the first polymer layer and the second polymer layer are repeatedly stacked.

20. The liquid crystal display of claim 19, wherein a total number of each of the first polymer layer and the second polymer layer which are repeatedly stacked is in a range of 10 to 30, and
a difference between the refractive indexes of the first polymer layer and the second polymer layer is in a range of 0.4 to 2.0.

* * * * *